(12) United States Patent
Otaka (10) Patent No.: US 7,864,553 B2
(45) Date of Patent: Jan. 4, 2011

(54) POWER SUPPLY CIRCUIT AND PORTABLE DEVICE (75) Inventor: Nobuyuki Otaka, Kadoma (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 281 days.

(21) Appl. No.: 12/261,725

(22) Filed: Oct. 30, 2008

(65) Prior Publication Data
US 2009/0115386 A1    May 7, 2009

(30) Foreign Application Priority Data
Nov. 1, 2007    (JP)    ............... 2007-285475

(51) Int. Cl.
*H02M 3/18*    (2006.01)
(52) U.S. Cl. .......................... 363/60; 363/59
(58) Field of Classification Search .................. 363/59, 363/60; 323/265, 271; 327/535–537
See application file for complete search history.

(56) References Cited
U.S. PATENT DOCUMENTS

| 4,460,952 | A | * | 7/1984 | Risinger | 363/61 |
| 6,249,446 | B1 | * | 6/2001 | Shearon et al. | 363/60 |
| 6,834,001 | B2 | * | 12/2004 | Myono | 363/60 |
| 7,099,166 | B2 | * | 8/2006 | Kim | 363/60 |
| 7,446,521 | B2 | * | 11/2008 | Taurand | 323/288 |

FOREIGN PATENT DOCUMENTS

JP    2005-72353    3/2005

OTHER PUBLICATIONS

Patent Abstracts of Japan for Japanese Publication No. 2005-072353, Publication date Mar. 17, 2005 (1 page).

* cited by examiner

*Primary Examiner*—Matthew V Nguyen
(74) *Attorney, Agent, or Firm*—Osha • Liang LLP (57) ABSTRACT In a power supply circuit, a first switching transistor and a second switching transistor are serially connected between another-side terminal GND and a one-side terminal $V_{CC}$ of an input power supply, and a third switching transistor and a fourth switching transistor are serially connected between the one-side terminal $V_{CC}$ of the input power supply and a boosted output terminal OUT. A shift capacitor is provided between a connection point of the first and second switching transistors and a connection point of the third and fourth switching transistors, and a holding capacitor is connected to the boosted output terminal OUT. A back gate switching circuit for switching a voltage to be applied to the back gate is provided for the third switching transistor.

10 Claims, 5 Drawing Sheets

POWER SUPPLY CIRCUIT AND PORTABLE DEVICE

PRIORITY INFORMATION

This application claims priority based on Japanese Patent Application No. 2007-285475 filed on Nov. 1, 2007, and hereby cites the application as included in the present application.

BACKGROUND ART

Field of Invention

The present invention relates to a power supply circuit and a portable device, and more particularly to a power supply circuit for boosting a voltage of an input power supply at a predetermined step-up ratio before outputting to a boosted output terminal, and a portable device having such a power supply circuit.

A power supply circuit for boosting a voltage of an input power supply at a predetermined step-up ratio and outputting to a boosted output terminal is generally referred to as a booster circuit. Using a capacitor, for example, a booster circuit can use a structure in which the capacitor is charged by the voltage at both ends of the input power supply and then serially connected to the input power supply, so that an output voltage that is double the voltage at the two ends of the input power supply is produced. A booster circuit utilizing charging of a capacitor, as described above, may be referred to as a charge pump circuit.

For example, Japanese Patent Laid-open Publication No. 2005-72353 discloses a booster circuit having a CMOS structure. Here, the source of an NMOS transistor is connected to the power supply voltage VDD on the input side, while the drain of the NMOS transistor is connected to a shift capacitor to which a pulse voltage is supplied from another terminal. Also, the drain of the NMOS transistor is additionally connected to the drain of a PMOS transistor, and a voltage holding capacitor and a boosted output terminal are connected to the source of the PMOS transistor. Then, identical clocks are supplied to the gates of the NMOS and PMOS transistors.

In this structure, the NMOS transistor is turned on and the PMOS transistor is turned off in response to an H level of clock signal, so that a voltage VDD is held in the shift capacitor. Then, in response to an L level of clock signal, the NMOS transistor is turned off and the PMOS transistor is turned on, and in this state the voltage of the shift capacitor is shifted by an amount equal to the voltage VDD in response to a voltage shift pulse. With the above, a voltage 2VDD is held in the holding capacitor, which can be output as a boosted voltage.

SUMMARY

The booster circuit disclosed in Japanese Patent Laid-open Publication No. 2005-72353 can be formed using a single channel transistor, rather than having a CMOS structure. When integrating this circuit on a semiconductor chip, the respective single channel transistors are electrically isolated. For example, when using a P-channel transistor, a common isolation voltage is applied to the n-wells of the respective P-channel transistors. The maximum + voltage is used as the common isolation voltage. For a booster circuit, the voltage at the boosted output terminal is the maximum voltage, and thus is applied to the n-wells of the respective P-channel transistors. With the above, the respective P-channel transistors are mutually electrically isolated and can operate independently.

Here, as described in Japanese Patent Laid-open Publication No. 2005-72353, with a structure in which transistors are serially connected between the power supply voltage and the boosted output terminal, when the transistor on the power supply voltage side is turned on, the drain and source of the transistor are both at the potential of the power supply voltage. Meanwhile, the voltage of the boosted output terminal, which is higher than the power supply voltage, is applied to the n-well of the transistor. That is, the voltage in the n-well becomes higher than the source voltage of the transistor, and accordingly a state in which a voltage different from the source voltage is applied to the so-called back gate results. With a voltage different from the source voltage applied to the back gate, as described above, the on-resistance of the transistor increases, and accordingly a large drop results when driving a current from the output.

An advantage of the present invention is to provide a power supply circuit capable of suppressing the influence of a voltage applied to a back gate in a boosting operation and a portable device having the power supply circuit.

A power supply circuit according to the present invention is a power supply circuit for boosting a voltage of an input power supply at a predetermined step-up ratio and outputting to a boosted output terminal, comprising a plurality of switching transistors for selection connected between another-side terminal and one-side terminal of the input power supply with a connection relationship predetermined according to a step-up ratio; a plurality of shift switching transistors connected between the one-side terminal of the input power supply and a boosted output terminal with a connection relationship predetermined according to the step-up ratio; a shift capacitor connected between one of a plurality of connection points between respective pairs of switching transistors for selection and one of a plurality of connection points between respective pairs of shift switching transistors, with a connection relationship predetermined according to the step-up ratio; a holding capacitor connected to the boosted output terminal; and a control circuit for turning the respective switching transistors on and off at a time predetermined according to the step-up ratio to hold the voltage of the input power supply in the shift capacitor, and using the voltage held in the shift capacitor, and then making a voltage at both ends of the holding capacitor be a voltage coefficient multiple of the voltage of the input power supply, wherein the respective transistors are formed on a semiconductor chip, and the power supply circuit has a switching circuit for switching a voltage to be applied to a back gage of at least one transistor, in which the voltage to be applied to the back gate is switched between a common isolation voltage determined in accordance with polarity of the transistor and a source voltage of the transistor, according to a time at which to turn the transistor on or off. Note that a coefficient multiple includes 1.5 times, −1 time, as well as an integer multiple, such as double, triple, and so forth.

In the power supply circuit according to the present invention, preferably, the switching circuit may be provided for each of the transistors other than a transistor directly connected to the boosted output terminal, among the plurality of shift switching transistors.

Also, the power supply circuit according to the present invention is a power supply circuit for boosting a voltage of an input power supply at a predetermined step-up ratio and outputting to a boosted output terminal, comprising a first transistor and a second transistor serially and sequentially connected between another-side terminal and one-side terminal of the input power supply; a third transistor and a fourth transistor serially and sequentially connected between the one-side terminal of the input power supply and a boosted output terminal; a shift capacitor provided between a connection point of the first transistor and the second transistor and a connection point of the third transistor and the fourth transistor; a holding capacitor connected to the boosted output terminal; and a control circuit for turning on the first transistor and the third transistor, and turning off the second transistor and the fourth transistor, to hold the voltage of the input power supply in the shift capacitor, and then turning off the first transistor and the third transistor and turning on the second transistor and the fourth transistor to add the voltage held in the shift capacitor to the voltage of the input power supply and shifting to the holding capacitor, wherein the respective transistors are formed on a semiconductor chip, and the power supply circuit has a switching circuit for switching a voltage to be applied to a back gate of the third transistor between a voltage at the boosted output terminal and a voltage at the one-side terminal of the input power supply according to a time at which to turn the third transistor on and off.

Also, in the power supply circuit, preferably, the input power supply may have a voltage $+V_{CC}$ at the one-side terminal and be grounded at the other-side terminal, and a voltage $+2V_{CC}$ may be output to the boosted output terminal. Also, in the power supply circuit, preferably, the input power supply may be grounded at the one-side terminal and have a voltage $+V_{CC}$ at the other-side terminal, and a voltage $-V_{CC}$ may be output to the boosted output terminal.

Also, in the power supply circuit, preferably, the switching circuit may set a period during which the voltage at the one-side terminal of the input power supply is applied to the back gate of the third transistor so as not to overlap a period during which the third transistor remains in an on state.

Also, in the power supply circuit, preferably, the shift capacitor and the holding capacitor may be externally connected to the semiconductor ship having a plurality of transistors formed thereon.

Also, a portable device according to the present invention is a portable device having a power supply circuit for boosting a voltage of an input power supply at a predetermined step-up ratio and outputting to a boosted output terminal, wherein the power supply circuit comprises a plurality of switching transistors for selection connected between an other-side terminal and an one-side terminal of the input power supply with a connection relationship predetermined according to a step-up ratio; a plurality of shift switching transistors connected between the one-side terminal of the input power supply and a boosted output terminal with a connection relationship predetermined according to the step-up ratio; a shift capacitor connected between one of a plurality of connection points between respective pairs of switching transistors for selection and one of a plurality of connection points between respective pairs of shift switching transistors, with connection relationship predetermined according to the step-up ratio; a holding capacitor connected to the boosted output terminal; and a control circuit for turning the respective switching transistors on and off at a time predetermined according to the step-up ratio to hold the voltage of the input power supply in the shift capacitor, and using the voltage held in the shift capacitor, and then making a voltage at both ends of the holding capacitor be a voltage coefficient multiple of the voltage of the input power supply, wherein the respective transistors are formed on a semiconductor chip, and the power supply circuit has a switching circuit for switching a voltage to be applied to a back gate of at least one transistor, in which the voltage to be applied to the back gate is switched between a common isolation voltage determined in accordance with polarity of the transistor and a source voltage of the transistor, according to a time at which to turn the transistor on or off.

With at least one of the above described structures, in the power supply circuit, a plurality of switching transistors for selection are connected between the other-side terminal and one-side terminal of the input power supply; a plurality of shift switching transistors are connected between the one-side terminal of the input power supply and boosted output terminal; a shift capacitor is provided between one of a plurality of connection points between respective pairs of switching transistors for selection and one of a plurality of connection points between respective pairs of shift switching transistors; and a holding capacitor is connected to the boosted output terminal. With this structure, the respective transistors are formed on a semiconductor chip, and a voltage to be applied to the back gate of at least one transistor is switched between a common isolation voltage determined according to the polarity of the transistor and the source voltage of the transistor according to a time at which to turn the transistor on or off. With the source voltage applied to the back gate, the on-resistance of the transistor is left free from the influence of the voltage applied to the back gate. With the above, increase of the on-resistance of the transistor, caused when a common isolation voltage is used as a voltage to be applied to the back gate, can be suppressed. Similar effects can also be achieved with a portable device having such a power supply circuit.

Also, in the power supply circuit, a switching circuit is provided for each of the transistors other than the transistor directly connected to the boosted output terminal among the plurality of shift switching transistors. The transistor directly connected to the boosted output terminal, when remaining in the on state, is not affected by the back gate connected to the boosted output terminal as the source and drain of the transistor are at the voltage of the boosted output terminal. Meanwhile, the other transistors, when remaining in the on state, are affected by the back gate connected to the boosted output terminal. Therefore, provision of a switching circuit to these transistors is desired.

Also, with at least one of the above described structures, in the power supply circuit, first and second transistors are serially and sequentially connected between the other-side terminal and one-side terminal of the input power supply; third and fourth transistors are serially and sequentially connected between the one-side terminal of the input power supply and boosted output terminal; a shift capacitor is provided between the connection point of the first and second transistors and a connection point of the third and fourth transistor; and a holding capacitor is connected to the boosted output terminal. With this structure, the respective transistors are formed on a semiconductor chip, and a voltage to be applied to the back gate of the third transistor is switched between the voltage at the boosted output terminal and the voltage at the one-side terminal of the input power supply according to a time at which to turn the third transistor on and off. As the voltage at the one-side terminal of the input power supply is the source voltage of the third transistor, the on-resistance of the transistor is left free from the influence of the voltage applied to the back gate. With the above, increase of the on-resistance of the transistor, which is caused when the voltage at the boosted output terminal is applied to the back gate, can be suppressed.

Also, in the power supply circuit, the input power supply outputs a voltage $+2V_{CC}$ to the boosted output terminal, with the one-side terminal thereof at a voltage $+V_{CC}$ and the other-side terminal thereof grounded. With the above, double boosting is achieved, while suppressing the influence of the voltage applied to the back gate. Also, in the power supply circuit, the one-side terminal thereof grounded and the other-side terminal thereof at a voltage $+V_{CC}$, then the boosted output terminal outputs a voltage $-V_{CC}$. With the above, so-called reverse boosting is achieved, while suppressing the influence of the voltage applied to the back gate.

Also, in the power supply circuit, the switching circuit sets a period during which the back gate of the third transistor is connected to the voltage at the one-side terminal of the input power supply so as not to overlap the period during which the third transistor remains in the on state. Although the diode between the drain and back gate of the third transistor or the diode between the source and back gate of the third transistor may sometimes be turned on when a voltage to be applied to the back gate is switched during a period in which the third transistor remains in the on state, the above described structure can eliminate the influence on these diodes.

Also, in the power supply circuit, the shift capacitor and holding capacitor are externally connected to a semiconductor chip having a plurality of transistors formed thereon. With an externally connectable capacitor, a sufficiently large capacitance value can be set, which makes it possible to carry out a boosting operation having sufficient current capacity.

BEST MODE FOR CARRYING OUT THE INVENTION

In the following, an embodiment of the present invention will be described in detail, based on the accompanying drawings. Initially, a double boosting power supply circuit will be described in detail as a representative example of boosting. For a power supply circuit other than double-boosting, the difference from a double boosting power supply circuit is mainly described. Note that, a portable device using battery driving and the like may require appropriate boosting depending on a circuit structure thereof. In such a case, such a device can have a power supply circuit to be described below.

Figure 1:
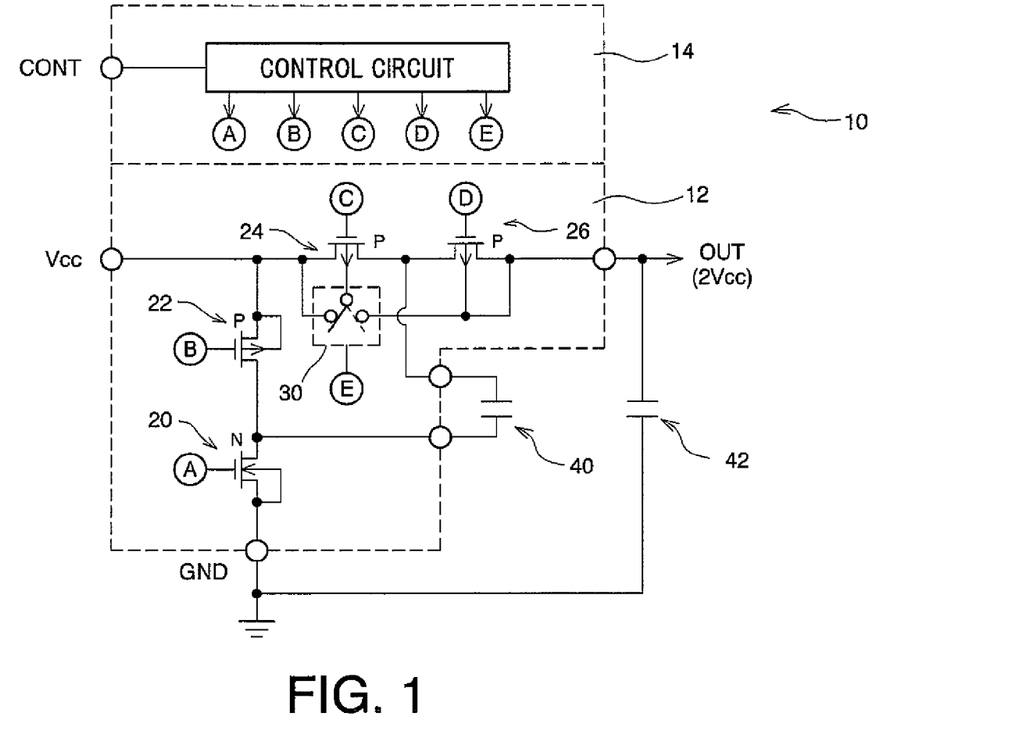
FIG. 1 is a structural diagram of a power supply circuit having a double boosting function in an embodiment of the present invention.

FIG. 1 is a structural diagram of a power supply circuit 10 having a double boosting function for boosting to double the voltage $V_{CC}$ of an input power supply to a voltage $2V_{CC}$ and then outputting to a boosted output terminal (OUT). The power supply circuit 10 comprises a switching circuit 12, a control circuit 14, and two capacitors, namely, a shift capacitor 40 and a holding capacitor 42, to be externally connected to the switching circuit 12. Note that as the voltage $V_{CC}$ of the input power supply is a value relative to ground (GND), it can be understood that the terminal denoted as $V_{CC}$ in FIG. 1 refers to a one-side terminal of the input power supply, while the terminal denoted as GND refers to another-side terminal of the same.

The switching circuit 12 comprises four transistors 20, 22, 24, 26 and a back gate switching circuit 30, in which a time to switch the transistors 20, 22, 24, 26 is controlled by the control circuit 14.

As to two of the four switching transistors, the first switching transistor 20 and second switching transistor 22 are serially connected in this order between ground (GND) and the input power supply ($V_{CC}$). That is, the first switching transistor 20 and second switching transistor 22 are serially connected between the other-side terminal and one-side terminal of the input power supply. As to the remaining two, the third switching transistor 24 and fourth switching transistor 26 are serially connected in this order between the input power supply ($V_{CC}$) and the boosted output terminal (OUT). That is, the third switching transistor 24 and fourth switching transistor 26 are serially connected between the one-side terminal of the input power supply and boosted output terminal.

The four switching transistors 20, 22, 24, 26 are MOS transistors and formed integrated on a single semiconductor chip. The first switching transistor 20 is an N-channel transistor having a back gate connected, together with the source terminal thereof, to ground GND. The second switching transistor 22 is a P-channel transistor having a back gate connected, together with the source terminal thereof, to the voltage $V_{CC}$. The fourth switching transistor 26 is a P-channel transistor having a back gate connected, together with the source terminal thereof, to the boosted output terminal (OUT). That is, supposing that a boosting operation is carried out, a voltage $2V_{CC}$ is applied to the back gate of the fourth switching transistor 26.

Note that a back gate switching circuit 30 is provided for the third switching transistor 24, which is a P-channel transistor, to switch a voltage to be applied to the back gate of the third switching transistor 24 between a voltage $V_{CC}$ and a voltage $2V_{CC}$ under control of the control circuit 14. That is, a voltage to be applied to the back gate is switched between the source voltage of the third switching transistor 24 and the voltage at the boosted output terminal (OUT), with details of the switching to be described later.

The control circuit 14 has a function for generating control signals to be supplied to the respective switching transistors 20, 22, 24, 26 and the back gate switching circuit 30 of the switching circuit 12. That is, a control signal A is generated for the first switching transistor 20, a control signal B is generated for the second switching transistor 22, a control signal C is generated for the third switching transistor 24, a control signal D is generated for the fourth switching transistor 26, and a control signal E is generated for the back gate switching circuit 30. The respective control signals A, B, C, D, and E generated are supplied to the control terminals of the corresponding respective devices.

The control circuit 14 can comprise a clock generating unit and a waveform generating unit for generating a control signal so as to have a desired waveform. The control circuit 14 can be formed integrated solely on one semiconductor chip or together with the switching circuit 12 on one semiconductor chip.

Before description about content of the control circuit 14, two other structural elements of the power supply circuit 10, that is, two capacitors, will be described. The shift capacitor 40 is a capacitive element provided between a connection point of the first switching transistor 20 and second switching transistor 22 and a connection point of the third switching transistor 24 and fourth switching transistor 26. The shift capacitor 40 has a function for being charged at the first step of a boosting operation by a voltage $V_{CC}$, or a voltage between the one-side terminal and other-side terminal of the input power supply, whereby charge is accumulated such that a voltage $V_{CC}$ is generated at both ends of the shift capacitor 40. At the second step of the boosting operation, the charge accumulated as a voltage $V_{CC}$ at both ends of the shift capacitor 40 is added by the voltage of the input power source $V_{CC}$, and shifted as a voltage $2V_{CC}$ toward the boosted output terminal (OUT). That is, with use of the voltage held in the shift capacitor 40, the voltage at the two ends of the holding capacitor 42 becomes a voltage coefficient multiple of the voltage $V_{CC}$ of the input power supply, or a voltage double the voltage $V_{CC}$ of the input power supply here, or a voltage $2V_{CC}$.

The holding capacitor 42, connected to the boosted output terminal (OUT), is a capacitive element having a function for accumulating charge of a voltage $2V_{CC}$, or a voltage obtained by adding the voltage of the input power supply $V_{CC}$ to the voltage $V_{CC}$ at the two ends of the shift capacitor 40 at the second step of the boosting operation.

The capacitance value of the shift capacitor 40 and that of the holding capacitor 42, as well as the frequency of a control signal generated by the control circuit 14, determine the magnitude of a current which can be extracted from the boosted output terminal (OUT). Generally, the smaller the capacitance value and the lower the frequency of the control signal, the smaller the amount of the current which can be extracted from the boosted output terminal (OUT). In view of the above, it is preferable to determine the capacitance value of the shift capacitor 40 and that of the holding capacitor 42 in accordance with the current capacitance required by a load. For this purpose, it is preferable for these capacitors 40, 42 to be externally connectable capacitors. As one example, a capacitor having a capacitance value of about 2 µF to about 5 µF can be used.

Figure 2:
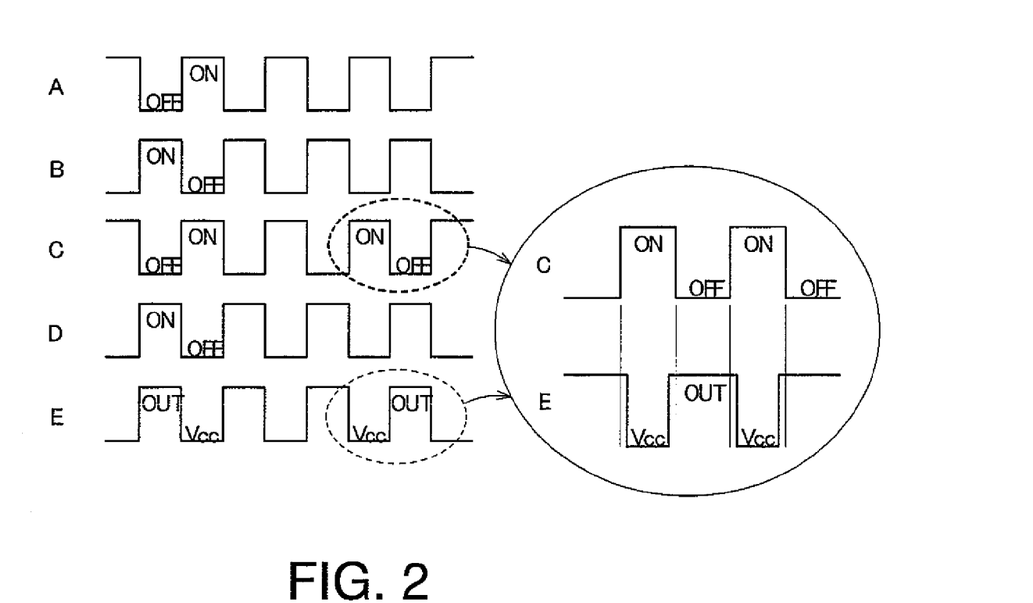
FIG. 2 is a diagram showing states of respective control signals in the embodiment of the present invention.

In the following, content of the control circuit 14 will be described. FIG. 2 is a diagram showing the control signals A, B, C, D, and E. In FIG. 2, in which the abscissas corresponds to time, change of the control signals A, B, C, D between the on and off states is shown with time origins therefor matched. Note that for the control signal E, change in the state of a voltage to be applied to the back gate of the third switching transistor 24 is shown.

As known from FIG. 2, the first switching transistor 20 and third switching transistor 24 are repetitively switched between the on and off states in a synchronized manner. The second switching transistor 22 and fourth switching transistor 26 are also repetitively switched between the on and off states in a synchronized manner. While the first switching transistor 20 and third switching transistor 24 are in the on state, the second switching transistor 22 and fourth switching transistor 26 are in the off state. While the second switching transistor 22 and fourth switching transistor 26 are in the on state, the first switching transistor 20 and third switching transistor 24 are in the off state.

A member to which a control signal for the back gate switching circuit 30 will be connected is changed in synchronism with change of the third switching transistor 24 between the on and off state. Specifically, while the third switching transistor 24 is in the off state, the voltage at the boosted output terminal (OUT) is applied to the back gate of the third switching transistor 24. And while the third switching transistor 24 is in the on state, the voltage at the input power source $V_{CC}$ is applied to the back gate of the third switching transistor 24. This corresponds to a state in which the back gate and source of the third switching transistor 24 are alternately connected.

The reason for the above is as follows. In general, in order to isolate a plurality of devices formed on a semiconductor chip, the highest voltage, except for the voltage at the control terminal, in the power supply circuit 10 is applied to the back gate of the third switching transistor 24, which is a P-channel transistor. In this embodiment, the highest voltage in the power supply circuit 10, assuming that a boosting operation is carried out, is the voltage $+2V_{CC}$ at the boosted output terminal (OUT) Application of the highest voltage to the back gate of the third switching transistor 24 in the off state will not affect the off state of the third switching transistor 24.

However, application of the voltage $+2V_{CC}$ to the back gate of the third switching transistor 24 in the on state results in application of a bias $+V_{CC}$ to the back gate relative to the source, as the source and drain thereof are both at a voltage $+V_{CC}$. This results in increase of the on-resistance of the third switching transistor 24. In order to avoid the above situation, a voltage $+V_{CC}$, or the source voltage, that is, the voltage at the one-side terminal of the input power supply, is applied to the back gate when the third switching transistor 24 is in the on state, instead of applying the highest voltage to the back gate. With the above, consequently, the back gate and source of the third switching transistor 24 are alternately connected, which can suppress the influence of the voltage applied to the back gate.

Figure 3:
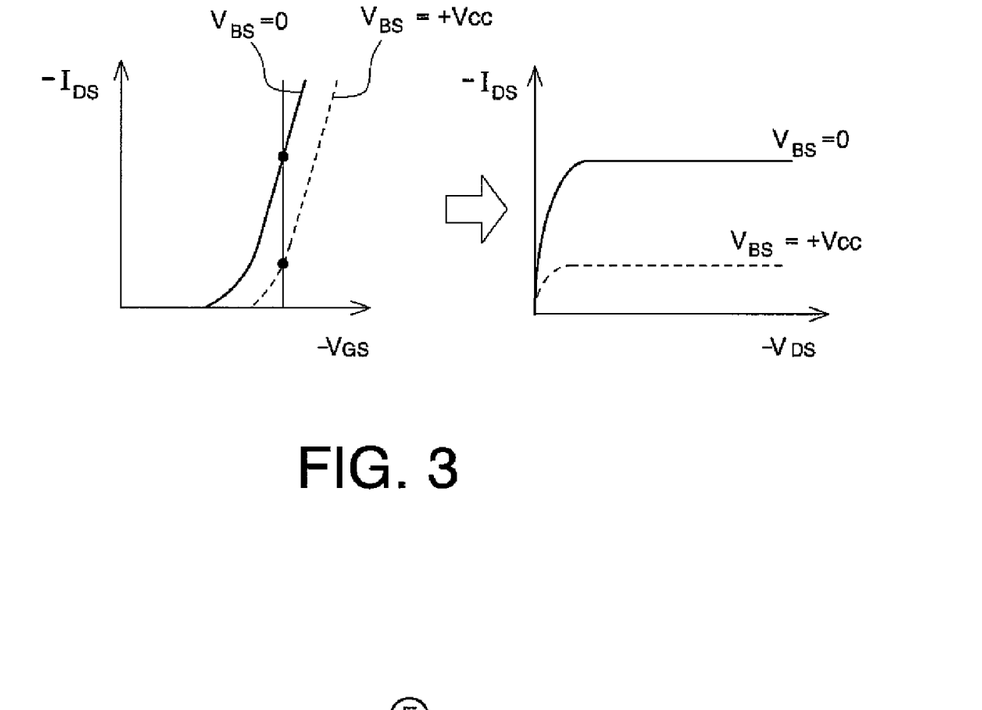
FIG. 3 is a diagram explaining influence of a voltage applied to a back gate in the embodiment of the present invention.

The above is shown in FIG. 3. The left diagram in FIG. 3 shows the characteristic of a drain current relative to the gate voltage of a P-channel transistor, in which the abscissa corresponds to a voltage $V_{GS}$ at the gate relative to the source and the ordinate corresponds to a current $I_{DS}$ flowing from the drain to the source. As this example is a P-channel, the sign is minus. In the diagram, as to the voltage $V_{BS}$, or a voltage at the back gate relative to the source, a characteristic of the voltage $V_{BS}$ being 0, or $V_{BS}=0$, with the back gate connected to the source is indicated by the solid line, while that of the voltage $V_{BS}$ being $+V_{CC}$, or $V_{BS}=+V_{CC}$, when a voltage $+V_{CC}$ is applied to the back gate relative to the source, is indicated by the broken line. The right diagram in FIG. 3 is a characteristic diagram corresponding to the left diagram, in which the abscissa corresponds to a voltage $V_{DS}$, or a voltage of the drain relative to the source, that is, a drain-source voltage, and the ordinate corresponds to a current $I_{DS}$.

As known from FIG. 3, with a voltage $+V_{CC}$ applied to the back gate relative to the source, rise of the current $I_{DS}$ shifts. As a result, a threshold on appearance becomes higher, and the magnitude of the current $I_{DS}$ relative to an identical voltage $V_{GS}$ decreases. That is, the on-resistance of the transistor increases.

Figure 4:
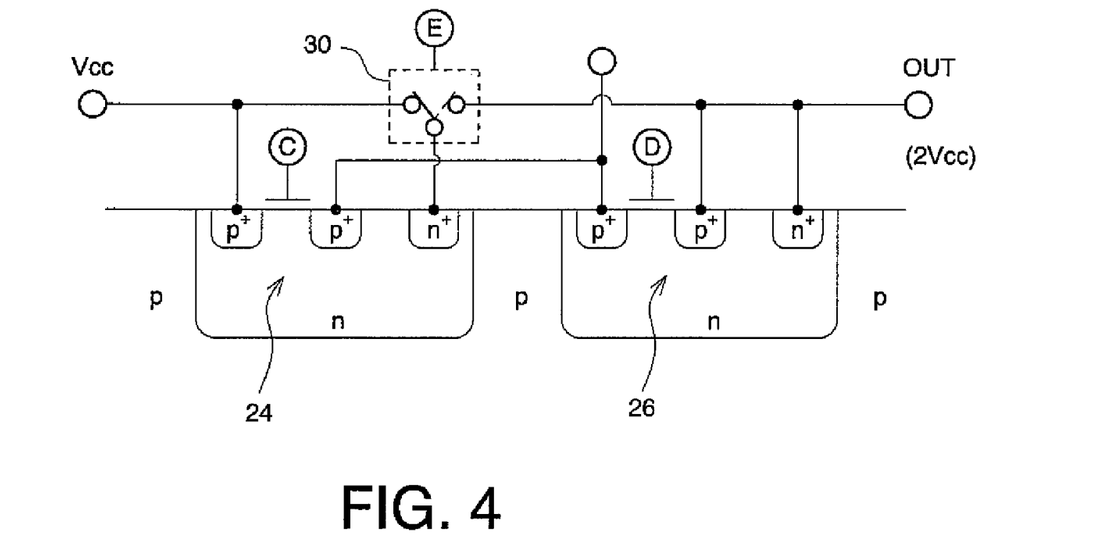
FIG. 4 is a diagram explaining transistors formed on a semiconductor chip in the embodiment of the present invention.

FIG. 4 is a diagram explaining the third switching transistor 24 and fourth switching transistor 26 formed on a semiconductor chip. Note that an element identical to that shown in FIG. 1 is given an identical reference numeral with detailed description thereof not repeated. The third switching transistor 24 and fourth switching transistor 26, operating with a different voltage relationship, are formed in different n-wells, and a isolation voltage is applied to isolate the n-wells. As the drain and source of the fourth switching transistor 26 in the on state are both at a voltage $+2V_{CC}$, a voltage $+2V_{CC}$ is applied to the n-well. For the third switching transistor 24, application of a voltage $+2V_{CC}$ to the n-well will not affect the on-resistance when the third switching transistor 24 is in the off state. However, as described with reference to FIG. 3, when the third switching transistor 24 is in the on state, application of a voltage $+2V_{CC}$ to the n-well results in the voltage $V_{BS}$ being $+V_{CC}$, or $V_{BS}=+V_{CC}$, as the source is at a voltage $+V_{CC}$. As a result, the n-well functions as a back gate with respect to a control signal applied to the gate, a threshold shifts, and on-resistance increases. In order to prevent this, the back gate is connected to the source, using the back gate switching circuit 30, when the third switching transistor 24 is in the on state. That is, a voltage $+V_{CC}$ is applied to the n-well. With the above, the voltage $V_{BS}$ becomes equal to 0, or $V_{BS}=0$, which prevents increase of the on-resistance.

Returning again to FIG. 2, it has been described in the above that connection of the back gate is switched according to a time at which to turn the third switching transistor 24 on and off. In FIG. 2 also, change of the control signal C is synchronized with change of the control signal E. Here, note that switching the control signal E at exactly the same time as that for change of the control signal C could result in erroneous operation of a pn-diode between the source and n-well shown in FIG. 4, or a pn-diode between the drain and n-well. In view of the above, it is preferable that time for changing the control signal C is set different from that for switching the control signal E.

The right diagram in FIG. 2 shows an example in which a period during which the voltage $V_{CC}$ at the one-side terminal of the input power supply is applied to the back gate of the third switching transistor 24 is set not overlapping a period during which the third switching transistor 24 remains in the on state. For example, supposing that the control signal C remains in the on state for a period about 1 µs, a period during which the control signal E has a voltage $V_{CC}$ can be set within this period of about 1 µs, displaced by about 0.1 µs at the beginning and end of the 1 µs period. This can suppress the influence on the pn-diode between the source and n-well or the pn-diode between the drain and n-well. Note that the above described numeric value setting is only one example and any other setting is applicable.

Figure 5:
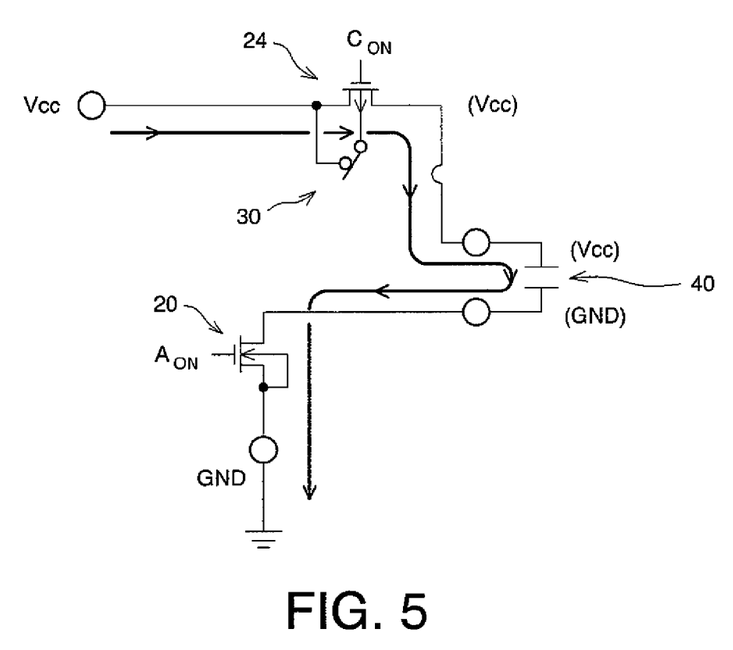
FIG. 5 is a diagram showing a state at the first step in a boosting operation in the embodiment of the present invention.
Figure 6:
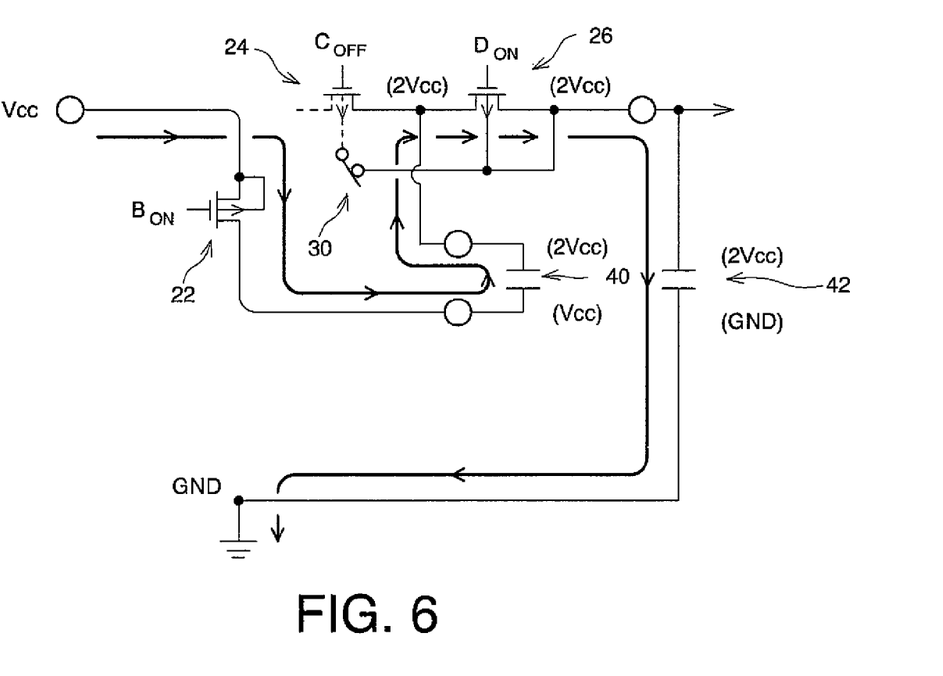
FIG. 6 is a diagram showing a state at the second step in the boosting operation in the embodiment of the present invention.

Operation of the above described structure will be described with reference to FIGS. 5 and 6. FIG. 5 is a diagram showing a state at the first step in a boosting operation; FIG. 6 is a diagram showing a state at the second step in the boosting operation. In the following, an element identical to that shown in FIG. 1 is given an identical reference numeral, with detail description thereof not repeated here.

In FIG. 5, at the first step of the boosting operation, the first switching transistor 20 and third switching transistor 24 are in the on state, and the second switching transistor 22 and fourth switching transistor 26 are in the off state. In the above, current flows, as indicated by the arrow in FIG. 5, from the one-side terminal ($V_{DD}$) of the input power supply via the third switching transistor 24, shift capacitor 40, and first switching transistor 20 to the other-side terminal (GND) of the input power supply. As a result, charge is accumulated in the shift capacitor 40, with a voltage $V_{CC}$ resulting at the both ends of the shift capacitor 40. In the above, the back gate of the third switching transistor 24 is connected to the source, as described above, and a voltage $V_{BS}$ being 0, or $V_{BS}=0$, results. Accordingly, increase of the on-resistance due to the voltage applied to the back gate is prevented.

Thereafter, the first switching transistor 20 and third switching transistor 24 are turned off and the second switching transistor 22 and fourth switching transistor 26 are turned on, upon which the second step of the boosting operation shown in FIG. 6 begins. Then, as indicated by the arrow in FIG. 6, current flows from the one-side terminal ($V_{DD}$) of the input power supply via the second switching transistor 22, shift capacitor 40, fourth switching transistor 26, and holding capacitor 42 to the other-side terminal (GND) of the input power supply. In the above, as the two ends of the shift capacitor 40 are already at the voltage $V_{CC}$ at the first step of the boosting operation, a voltage $2V_{CC}$ obtained by adding the voltage $V_{CC}$ of the input power supply to this voltage $V_{CC}$ is held in the holding capacitor 42, and then output to the boosted output terminal (OUT). In this manner, the voltage $+V_{CC}$ of the input power supply is boosted to a voltage $+2V_{CC}$. In the above, as the third switching transistor 24 is in the off state, the maximum voltage $+2V_{CC}$ can be applied to the back gate, like in a normal case, without affecting the on-resistance.

Figure 7:
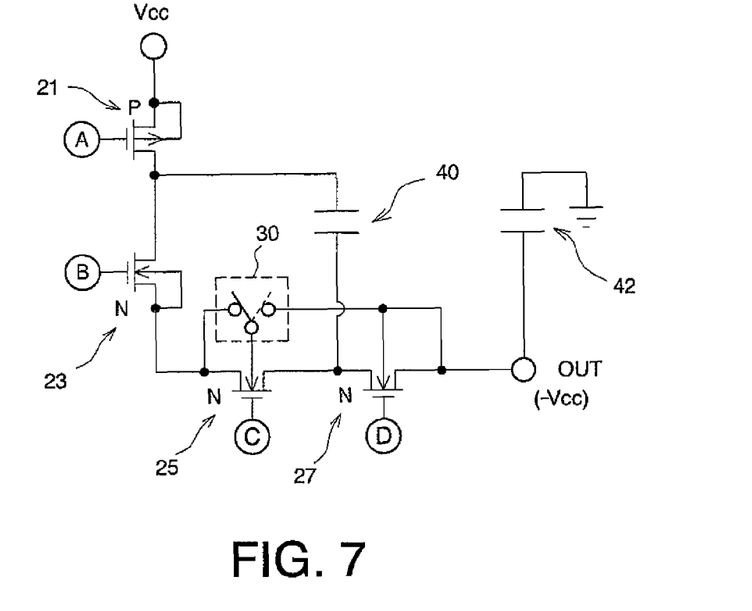
FIG. 7 is a structural diagram of a power supply circuit having a reverse boosting function in the embodiment of the present invention.
Figure 8:
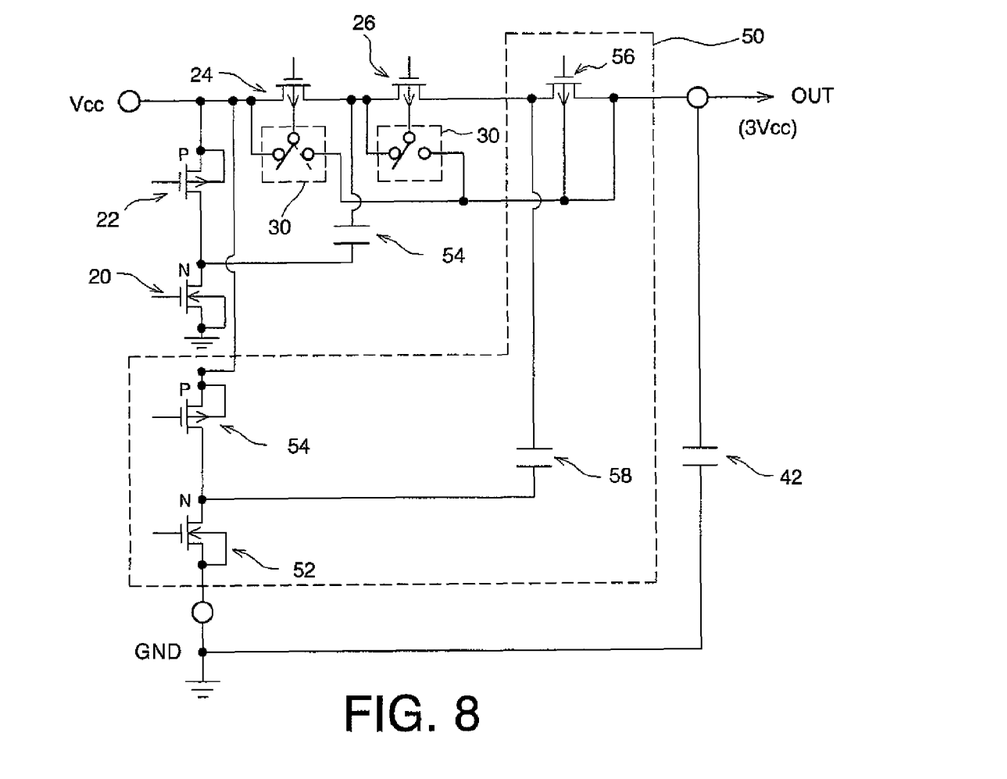
FIG. 8 is a structural diagram of a boosting power supply having a triple boosting function in the embodiment of the present invention.
Figure 9:
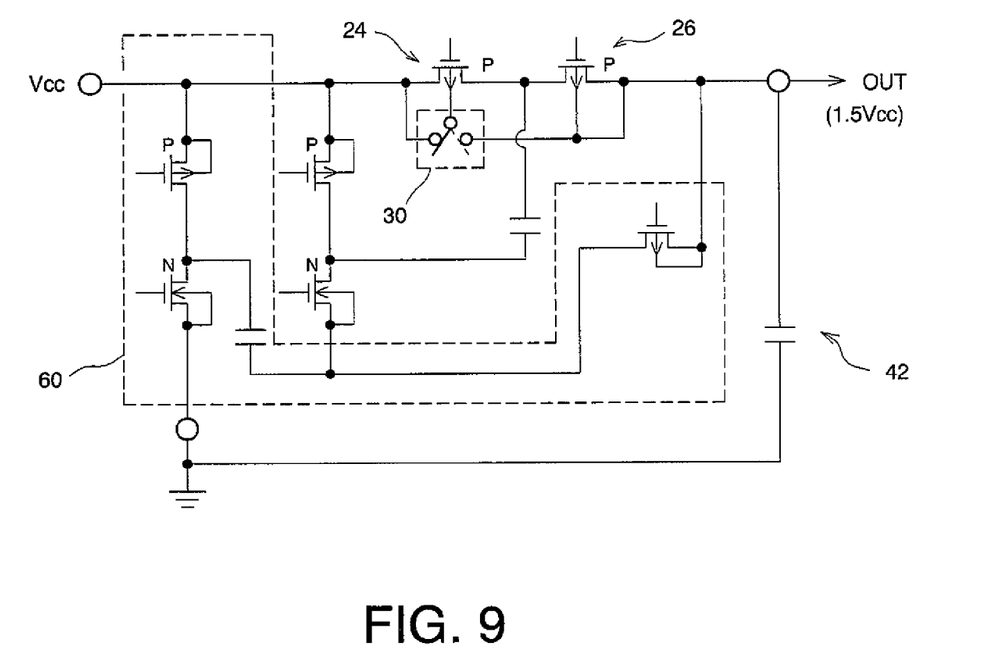
FIG. 9 is a structural diagram of a power supply circuit having a 1.5 times boosting function in the embodiment of the present invention.

In the following, a power supply circuit for boosting other than double boosting will be described. FIG. 7 is a structural diagram of a reverse boosting power supply circuit; FIG. 8 is a structural diagram of a triple boosting power supply circuit; and FIG. 9 is a structural diagram of a 1.5 times boosting power supply circuit. In the following, an element identical to that shown in FIG. 1 is given an identical reference numeral, with detailed description thereof not repeated here.

FIG. 7 is a structural diagram of a reverse boosting power supply circuit. Note that reverse-boosting refers to a type of boosting in which a voltage $-V_{CC}$ is output to the boosted output terminal (OUT) relative to the voltage $+V_{CC}$ of the input power supply. As shown in FIG. 7, a structure of the reverse boosting power supply circuit is such that the polarities of the respective switching transistors 21, 23, 25, 27 of the structure described with reference to FIG. 1 are reversed, and the voltage at the two ends of the shift capacitor is output in the opposite direction relative to grounding. Here also, a back gate switching circuit 30 is provided to the back gate of the third switching transistor 25, which is an N-channel transistor, and similar to the case described with reference to FIG. 1, a voltage at the source or the boosted output terminal (OUT) is applied to the back gate in response to turning the third switching transistor 25 on and off. This can suppress increase of the on-resistance due to the voltage applied to the back gate when the third switching transistor 25 remains in the on state.

FIG. 8 is a structural diagram of a triple boosting power supply circuit. Compared to FIG. 1, a circuit portion 50 including switching transistors 52, 54, 56 and a capacitor 58 is newly added. With this addition, a voltage $3V_{CC}$ is output to the boosted output terminal (OUT) with respect to the input power supply $V_{CC}$. That is, a voltage coefficient multiple of the input power source $V_{CC}$, or three times the input power supply $V_{CC}$ in this case, or a voltage $3V_{CC}$, is output. Three P-channel transistors are serially connected between the one-side terminal of the input power supply and boosted output terminal (OUT) here. Therefore, application of the maximum voltage $3V_{CC}$ to the back gates of the switching transistors 24, 26, except the switching transistor 56 directly connected to the boosted output terminal (OUT), does not result in the voltage $V_{BS}$ being 0, or $V_{BS}=0$, during a period in which the switching transistors 24, 26 remain in the on state. In view of the above, a back gate switching circuit 30 is provided for each of the back gates of the switching transistors 24, 26 to control such that the source is connected to the back gate when the switching transistors 24, 26 are in the on state. This can suppress increase of the on-resistance due to the voltage applied to the back gate.

Note that sequential addition of a portion corresponding to the circuit portion 50 to the structure shown in FIG. 8 makes it possible to realize four and five times boosting and so forth. In these cases, the number of P-channel transistors serially connected between the one-side terminal of the input power supply and boosted output terminal (OUT) is increased. Even in this case, a back gate switching circuit is provided for each of the switching transistors other than the switching transistor 56 directly connected to the boosted output terminal (OUT) so that the source is connected to the back gate when these switching transistors are turned on. This can suppress increase of the on-resistance due to the voltage applied to the back gate.

FIG. 9 is a structural diagram of a 1.5 times boosting power supply circuit. The circuit portion 60 is added here to the structure shown in FIG. 1. In this case, two P-channel transistors are serially connected between the one-side terminal of the input power supply and the boosted output terminal (OUT). Thus, similar to the case shown in FIG. 1, a back gate switching circuit 30 is provided for the third switching transistor 24 so that the source is connected to the back gate when the third switching transistor 24 is turned on. This can suppress increase of the on-resistance due to the voltage applied to the back gate in the third switching transistor 24.

As described above, in a power supply circuit for boosting at a step-up ratio other than double boosting, a plurality of switching transistors for selection are provided between the other-side terminal and one-side terminal of the input power supply; and a plurality of shift switching transistors are provided between the one-side terminal of the input power supply and boosted output terminal; a shift capacitor is provided between one of a plurality of connection points between respective pairs of switching transistors for selection and one of a plurality of connection points between respective pairs of shift switching transistors; and a holding capacitor is connected to the boosted output terminal. With this structure, the respective transistors are formed on a semiconductor chip, a voltage to be applied to the back gate of at least one transistor is switched between a common isolation voltage determined according to the polarity of the transistor and the source voltage of the transistor according to a time at which to turn the transistor on and off. This can suppress increase of the on-resistance due to the voltage applied to the back gate.

What is claimed is:

1. A power supply circuit for boosting a voltage of an input power supply at a predetermined step-up ratio and outputting to a boosted output terminal, comprising:
   a plurality of switching transistors for selection connected between another-side terminal and a one-side terminal of the input power supply with a connection relationship predetermined according to a step-up ratio;
   a plurality of shift switching transistors connected between the one-side terminal of the input power supply and a boosted output terminal with a connection relationship predetermined according to the step-up ratio;
   a shift capacitor connected between one of a plurality of connection points between respective pairs of switching transistors for selection and one of a plurality of connection points between respective pairs of shift switching transistors with a connection relationship predetermined according to the step-up ratio;
   a holding capacitor connected to the boosted output terminal; and
   a control circuit for turning the respective switching transistors on and off at a time predetermined according to the step-up ratio to hold the voltage of the input power supply in the shift capacitor, and using the voltage held in the shift capacitor, and then making a voltage at both ends of the holding capacitor be a voltage coefficient multiple of the voltage of the input power supply, wherein
   the respective transistors are formed on a semiconductor chip, and
   the power supply circuit has a switching circuit for switching a voltage to be applied to a back gate of at least one transistor, in which the voltage to be applied to the back gate is switched between a common isolation voltage determined in accordance with polarity of the transistor and a source voltage of the transistor, according to a time at which to turn the transistor on or off.

2. The power supply circuit according to claim 1, wherein the switching circuit is provided for each of the transistors other than a transistor directly connected to the boosted output terminal among the plurality of shift switching transistors.

3. A power supply circuit for boosting a voltage of an input power supply at a predetermined step-up ratio and outputting to a boosted output terminal, comprising:
   a first transistor and a second transistor serially and sequentially connected between another-side terminal and a one-side terminal of the input power supply;
   a third transistor and a fourth transistor serially and sequentially connected between the one-side terminal of the input power supply and a boosted output terminal;
   a shift capacitor provided between a connection point of the first transistor and the second transistor and a connection point of the third transistor and the fourth transistor;
   a holding capacitor connected to the boosted output terminal; and
   a control circuit for turning the first transistor and the third transistor on and turning the second transistor and the fourth transistor off to hold the voltage of the input power supply in the shift capacitor, and then turning the first transistor and the third transistor off and turning the second transistor and the fourth transistor on to add the voltage held in the shift capacitor to the voltage of the input power supply and shifting to the holding capacitor, wherein
   the respective transistors are formed on a semiconductor chip, and
   the power supply circuit has a switching circuit for switching a voltage to be applied to a back gate of the third transistor between a voltage at the boosted output terminal and a voltage at the one-side terminal of the input power supply according to a time at which to turn the third transistor on and off.

4. The power supply circuit according to claim 3, wherein the input power supply has a voltage $+V_{CC}$ at the one-side terminal and is grounded at the other-side terminal, and a voltage $+2V_{CC}$ is output to the boosted output terminal.

5. The power supply circuit according to claim 3, wherein the input power supply is grounded at the one-side terminal and has a voltage $+V_{CC}$ at the other-side terminal, and a voltage $-V_{CC}$ is output to the boosted output terminal.

6. The power supply circuit according to claim 3, wherein the switching circuit sets a period during which the voltage at the one-side terminal of the input power supply is applied to the back gate of the third transistor so as not to overlap a period during which the third transistor remains in an on state.

7. The power supply circuit according to claim 1, wherein the shift capacitor and the holding capacitor are externally connected to the semiconductor chip having a plurality of transistors formed thereon.

8. The power supply circuit according to claim 2, wherein the shift capacitor and the holding capacitor are externally connected to the semiconductor chip having a plurality of transistors formed thereon.

9. The power supply circuit according to claim 3, wherein the shift capacitor and the holding capacitor are externally connected to the semiconductor chip having a plurality of transistors formed thereon.

10. A portable device having a power supply circuit for boosting a voltage of an input power supply at a predetermined step-up ratio and outputting to a boosted output terminal, wherein the power supply circuit comprises:

a plurality of switching transistors for selection connected between another-side terminal and an one-side terminal of the input power supply with a connection relationship predetermined according to a step-up ratio;

a plurality of shift switching transistors connected between the one-side terminal of the input power supply and a boosted output terminal with a connection relationship predetermined according to the step-up ratio;

a shift capacitor connected between one of a plurality of connection points between respective pairs of switching transistors for selection and one of a plurality of connection points between respective pairs of shift switching transistors with a connection relationship predetermined according to the step-up ratio;

a holding capacitor connected to the boosted output terminal; and a control circuit for turning the respective switching transistors on and off at a time predetermined according to the step-up ratio to hold the voltage of the input power supply in the shift capacitor, and using the voltage held in the shift capacitor, and then making a voltage at both ends of the holding capacitor be a voltage coefficient multiple of the voltage of the input power supply, using the voltage held in the shift capacitor, wherein the respective transistors are formed on a semiconductor chip, and the power supply circuit has a switching circuit for switching a voltage to be applied to a back gate of at least one transistor, in which the voltage to be applied to the back gate is switched between a common isolation voltage determined in accordance with polarity of the transistor and a source voltage of the transistor, according to a time at which to turn the transistor on or off.

* * * * *